(No Model.) 3 Sheets—Sheet 1.

J. C. WANDS.
SIDE BEARING FOR RAILWAY CARS.

No. 590,286. Patented Sept. 21, 1897.

Witnesses
M. Darley.
Harry S. Arthur.

Inventor
John C. Wands
By his Attorney F. W. Ritter Jr.

THE NORRIS PETERS CO., PHOTO-LITHO., WASHINGTON, D. C.

(No Model.) 3 Sheets—Sheet 2.

J. C. WANDS.
SIDE BEARING FOR RAILWAY CARS.

No. 590,286. Patented Sept. 21, 1897.

Witnesses
M. Darley.
Harry S. Rohrer.

Inventor
John C. Wands
By his Attorney (No Model.) 3 Sheets—Sheet 3.

J. C. WANDS.
SIDE BEARING FOR RAILWAY CARS.

No. 590,286. Patented Sept. 21, 1897.

Witnesses
Om. Darley.
Harry S. Bohrer.

Inventor
John C. Wands
By his Attorney F. W. Ritter Jr.

UNITED STATES PATENT OFFICE.

JOHN C. WANDS, OF ST. LOUIS, MISSOURI.

SIDE BEARING FOR RAILWAY-CARS.

SPECIFICATION forming part of Letters Patent No. 590,286, dated September 21, 1897.

Application filed June 5, 1897. Serial No. 639,538. (No model.)

*To all whom it may concern:*

Be it known that I, JOHN C. WANDS, a citizen of the United States, residing at St. Louis, in the State of Missouri, have invented certain new and useful Improvements in Side Bearings for Railway-Cars; and I hereby declare the following to be a full, clear, and exact description of the same, reference being had to the accompanying drawings, in which—

Figure 1:
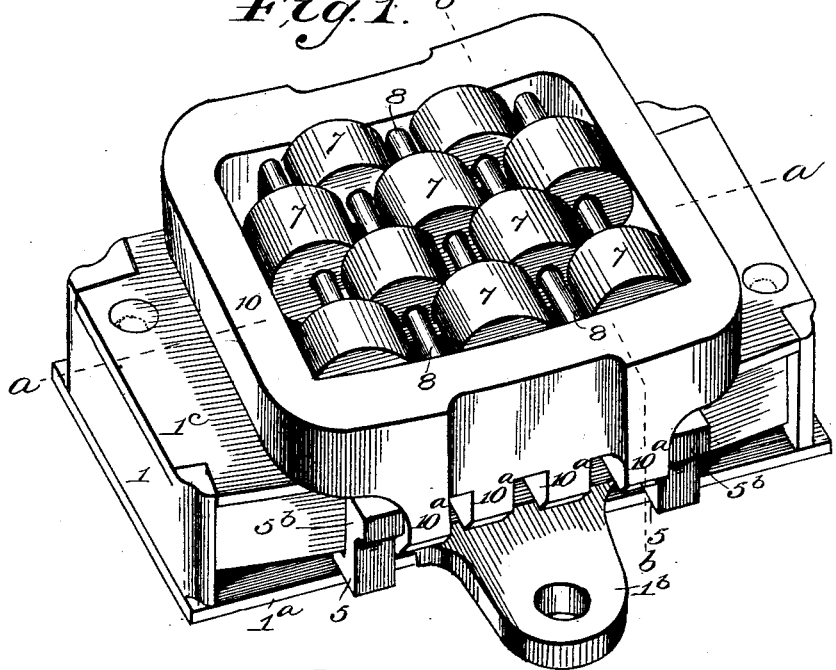
Figure 2:
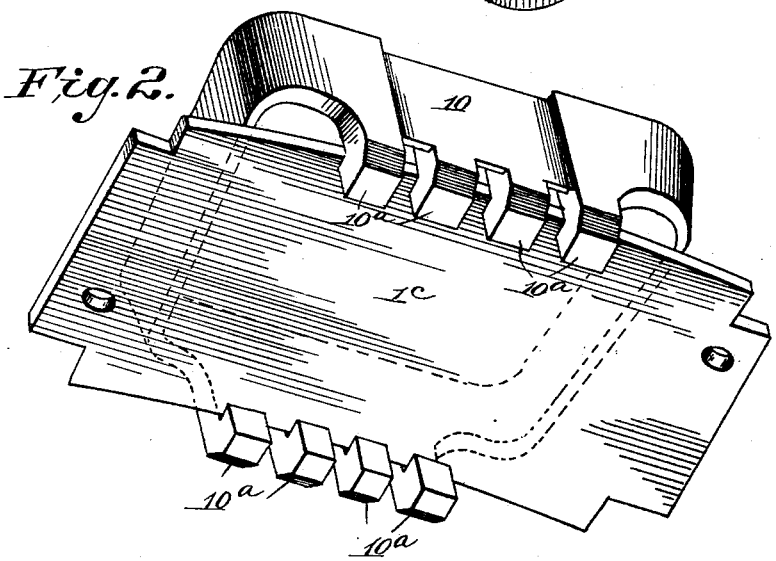
Figure 3:
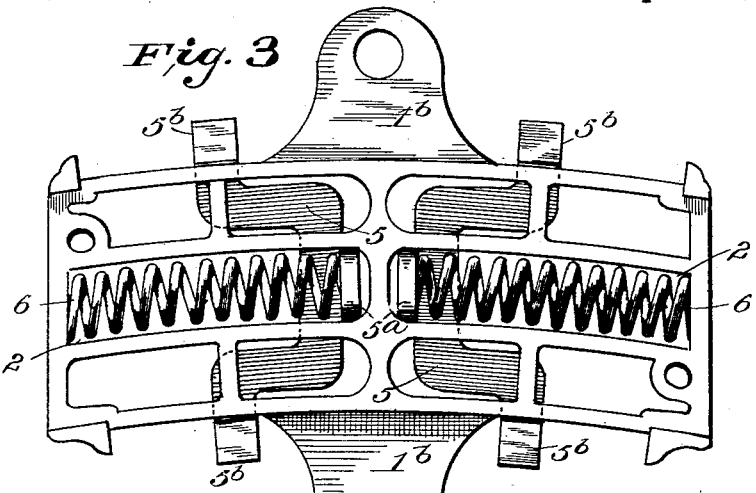
Figure 4:
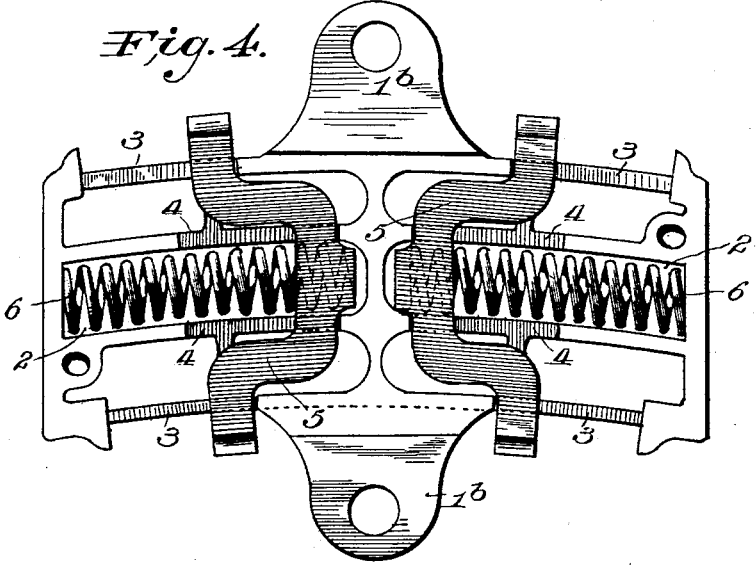
Figure 5:
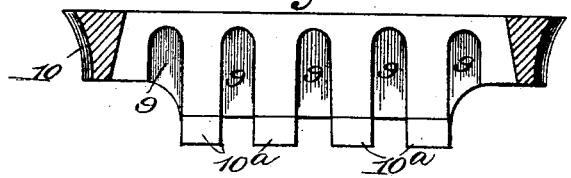
Figure 6:
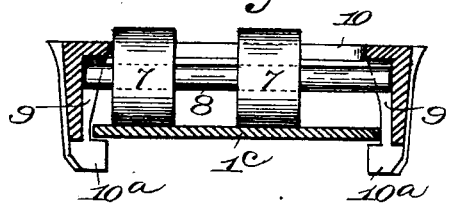
Figure 7:
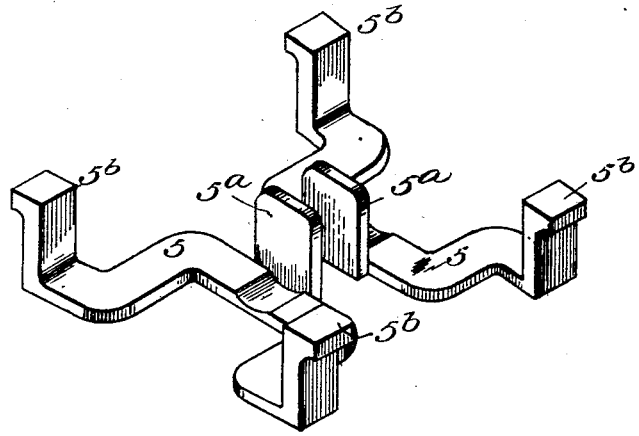

Figure 1 is a top perspective view of a side bearing embodying my invention. Fig. 2 is a detached bottom perspective view of the roller frame or carriage and the track-plate, which latter forms the cover of the centering-spring box, base, or housing. Fig. 3 is a top plan view of the base, centering-spring box or housing, the track-plate or cover thereof removed, also showing the yokes whereby the centering-springs connect with and control the roller-carriage. Fig. 4 is a bottom plan view of the centering-spring box or housing, the bottom plate removed to show the interior of the box and the spring-yokes. Fig. 5 is a sectional view of the roller frame or carriage on the line $a\,a$, Fig. 1, the rollers and roller-shafts removed to show the end bearings for the roller-shafts in the frame or carriage. Fig. 6 is a sectional view of the roller frame or carriage on the line $b\,b$, Fig. 1, a roller-shaft and the rollers thereon being shown in elevation; and Fig. 7 is an enlarged detached perspective view of the yokes or spiders which are acted on by the centering-springs.

Like symbols refer to like parts wherever they occur.

My invention relates to the construction of antifriction side bearings for railway-cars, and has for its object the production of a simple and efficient self-centering bearing wherein the antifriction-rollers will adjust themselves to the difference of travel on the various radii, thus avoiding torsional strain, jamming, and frictional wear on the rollers and insuring the return of the bearing to its normal or central position on tangents or when relieved of the load and not in operation.

To this end the main feature of my present invention embraces the combination, with a movable or traveling antifriction side bearing, of resilient means for restoring the bearing to its central position when relieved of the load, said means arranged parallel with the path of the bearing.

A second feature of my invention embraces the combination, with a spring-housing, of an antifriction-bearing arranged to travel thereon and a spring or springs arranged within the housing and which act on the antifriction-bearing.

A third feature of my invention embraces the combination, with a spring-housing and springs, of an antifriction-bearing adapted to travel on the spring-housing, and sliding yokes or spiders interposed between the springs and antifriction-bearing for coupling the springs with the movable antifriction-bearing and restoring the bearing to its central position when not in operation.

There are other minor features of invention, all as will hereinafter more fully appear.

I will now proceed to describe my invention more fully, so that others skilled in the art to which it appertains may apply the same.

In the drawings, 1 indicates a base, box, or spring-housing which may be closed below by a plate $1^a$, of wrought-iron, mild steel, or other suitable material, to afford a perfectly flat bearing on the truck-bolster and also a surface over which the spring yokes or spiders may slide freely.

The base or housing 1, which is preferably a malleable-iron casting, may be of skeleton form to obtain lightness with strength and to afford spring pockets or recesses 2 2, in which are housed the centering-springs which control the movable antifriction-bearing. On its under surface the base or housing 1 is cut away or recessed, as at 3 and 4, to receive and allow of the travel of sliding yokes or spiders 5 5, and, as hereinbefore noted, said housing has its bottom closed by plate $1^a$, which serves to confine the sliding yokes or spiders 5 5.

5 5 indicate sliding yokes or spiders (see Fig. 7) which are each provided with an offset or lug $5^a$, adapted to enter the recess 2 and form one bearing of a centering-spring 6, and said sliding yokes where they extend beyond the base 1 are turned up or provided with lugs $5^b\,5^b$, adapted to engage pendent lugs (see Fig. 1) on the frame of the antifriction-bearing.

6 6 indicate spiral springs housed in the pockets 2 2 of the base 1, so as to have each one bearing on the outer walls of said pocket and the other on the lugs 5ª 5ª of the respective yokes or spiders, whereby said yokes or spiders are constantly forced toward each other by the action of the springs and when released will assume a central position with relation to the base.

Projecting from the sides of the housing or base 1 are perforate flanges or ears 1ᵇ, by means of which the base or housing 1 may be bolted or otherwise secured to the top of the truck-bolster. The housing or base 1 is closed above by a plate 1ᶜ, which, with the bottom plate 1ª, may, if desired, be secured to the base or housing 1 by a single rivet or bolt at each end of the base or housing, (see rivet-holes, Fig. 1,) and as the plate 1ᶜ constitutes the track-plate of the bearing it is preferably made of high-carbon steel, though good results may be obtained by using cast gray iron chilled three-sixteenths ($\frac{3}{16}$) of an inch deep on the wearing surface.

The antifriction-bearing is preferably composed of rows of short rollers 7 7, arranged loosely on a series of shafts 8 8, said shafts arranged radially to the center of the truck and journaled in recesses 9 9 (see Figs. 5 and 6) in a frame 10, the rollers of adjacent rows overlapping, thus making adequate provision for the difference of travel of the roller on various radii and also increasing the points of support without enlarging the area required on the truck-bolster for the bearing.

10 indicates the roller frame or carriage of the bearings, said frame being provided on both sides with a series of pendent lugs 10ª, the outer of which are adapted to engage the upwardly-projecting lugs 5ᵇ 5ᵇ of the yokes 5 5, and said lugs 10ª, or sufficient thereof for the purpose, are undercut or extended inwardly to take under the track-plate 1ᶜ and confine the traveling carriage or frame 10 and the antifriction-rollers to and cause the same to travel upon the track-plate or cover 1ᶜ of the base or housing 1.

The construction being of substantially the character hereinbefore set forth the several elements thereof may be combined by first placing the sliding yokes or spiders 5 5 in the recesses 3 3 4 4 on the under side of the base 1 (see Fig. 4) with the lugs 5ª 5ª projecting into the spring pockets or recesses 2 2 and the lugs 5ᵇ 5ᵇ, &c., projecting on the outside of the base, after which the coiled springs 6 6 are inserted in the pockets 2 2 with one end of each bearing on the outer walls of the pockets and the other ends on the lug 5ª of the respective sliding yokes or spiders 5 5 and the bottom plate 1ª applied to the base 1 to confine the yokes or spiders 5 5. Next the antifriction-rollers 7 7 7 7 are slipped upon the shafts 8 8, usually two rollers to a shaft, and the shafts dropped into the bearing-recesses 9 9 (see Figs. 5 and 6) of frame 10, the rollers being so disposed as to overlap and form a series of rows, as indicated in Fig. 1, after which they may be confined by sliding the track-plate 1ᶜ under the pendent lugs 10ª of frame 10, (see Figs. 2 and 6,) and finally the track-plate 1ᶜ, which constitutes the cover of base or housing 1, may be placed on the housing 1 (see Fig. 1) and the parts connected by a bolt or rivet passed through top plate 1ᶜ, housing or base 1, and bottom plate 1ª, after which the device as a whole may be secured to the truck-bolster by bolts passed through the perforated flanges or ears 1ᵇ.

In operation the movable bearing 10 7 will travel on the base or housing 1 in one direction or the other, according to the curve of the track, so long as the load bears on it and in so doing will through the traveling slide or spider 5 compress corresponding spring 6, the reaction of which spring will restore the bearing to its central or normal position as soon as the load is lifted and the bearing released.

Among the advantages derived from the construction of antifriction side bearings substantially as hereinbefore set forth are the compactness, simplicity, and durability of the bearing and the protection against injury or loss which is afforded the means employed for centering the bearing.

Having thus described my invention, what I claim, and desire to secure by Letters Patent, is—

1. In a side bearing for railway-cars the combination with a movable antifriction-bearing, of resilient means for restoring the bearing to its central position when relieved of its load, said means arranged parallel with the line of travel of the bearing; substantially as and for the purposes specified.

2. In a side bearing for railway-cars, the combination with a traveling antifriction-bearing, of resilient means for restoring the bearing to its central position, said means arranged below and parallel with the line of travel of the bearing; substantially as and for the purposes specified.

3. In a side bearing for railway-cars, the combination with a suitable frame provided with antifriction-rollers, of centering-springs arranged parallel with the plane of the carriage; substantially as and for the purposes specified.

4. In a side bearing for railway-cars, the combination with a movable antifriction-roller bearing, of centering-springs arranged parallel with the travel of the bearing, and interposed yokes for connecting the springs with the movable bearing; substantially as and for the purposes specified.

5. In a side bearing for railway-cars, the combination with a movable antifriction-roller bearing, of a base or housing on which the bearing travels, and centering-springs arranged in the housing and connected with the movable bearing; substantially as and for the purposes specified.

6. In a side bearing for railway-cars, the combination with a movable antifriction-roller bearing, of a base or housing on which the bearing travels, centering-springs inclosed in the base or housing, and yokes, for connecting the springs with the movable antifriction-roller bearing; substantially as and for the purposes specified.

7. In a side bearing for railway-cars, the combination with a base or housing provided with a cover which constitutes the track-plate of the movable bearing, of an antifriction-roller bearing having a frame provided with lugs which take under and confine the bearing to the track-plate, and resilient centering means inclosed within the base or housing and connected with the frame of the movable antifriction-roller bearing; substantially as and for the purposes specified.

In testimony whereof I affix my signature, in presence of two witnesses, this 2d day of June, 1897.

JOHN C. WANDS.

Witnesses:
 HUGH K. WAGNER,
 G. A. PENNINGTON.